Feb. 16, 1926.
O. P. MUNSON
1,573,010
DEMOUNTABLE RIM
Filed August 13, 1923
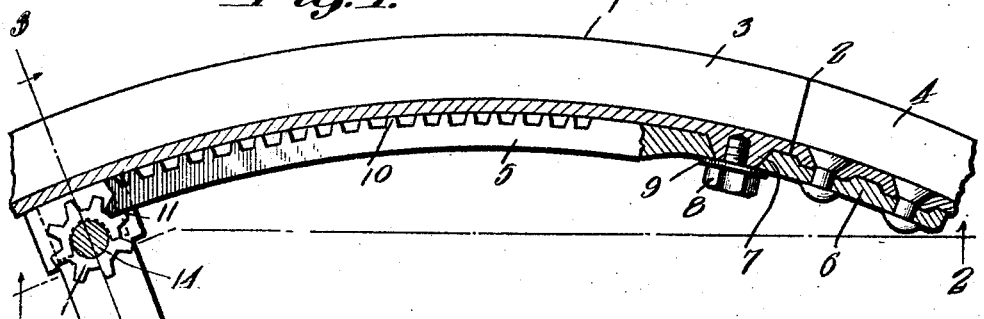
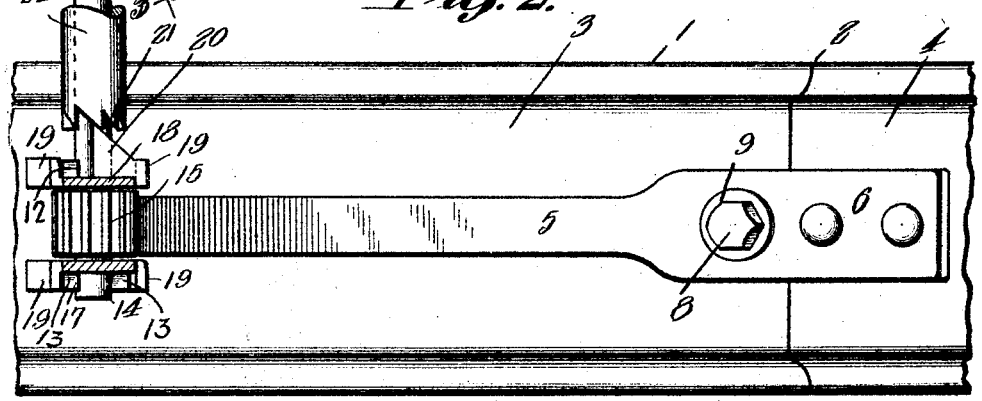
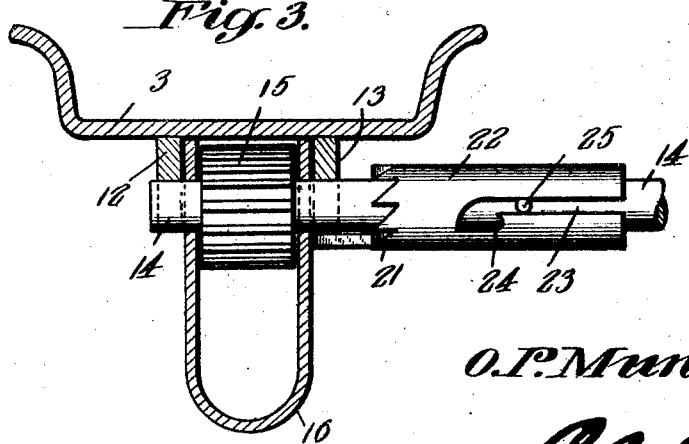
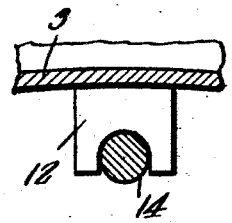
O. P. Munson, Inventor
By CA Snow & Co.
Attorney Patented Feb. 16, 1926.

1,573,010

UNITED STATES PATENT OFFICE.

OLIVER P. MUNSON, OF CLINTON, INDIANA, ASSIGNOR, BY MESNE ASSIGNMENTS, OF ONE-HALF TO OPAL HARRISON, OF CAYUGA, INDIANA.

DEMOUNTABLE RIM.

Application filed August 13, 1923. Serial No. 657,070.

*To all whom it may concern:*

Be it known that I, OLIVER P. MUNSON, a citizen of the United States, residing at Clinton, in the county of Vermilion and State of Indiana, have invented a new and useful Demountable Rim, of which the following is a specification.

This invention relates to demountable rims for vehicles wheels such as are used in connection with pneumatic tires.

The object of the invention is to provide a rim of this character constructed so that a tire may be quickly applied thereto or removed therefrom with a minimum amount of exertion, and which when applied will be securely held.

Another object is to provide a split rim of this character and a suitable tool for connecting and disconnecting the ends thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a longitudinal section of a portion of a demountable rim constructed in accordance with this invention, the connector being shown partly in side elevation and partly in section, and the tool used in applying and removing the rim being shown in section;

Figure 2 is a horizontal section taken on the line 2—2 of Fig. 1;

Fig. 3 is a transverse section taken on the line 3—3 of Fig. 1; and

Fig. 4 is a detail sectional view.

In the embodiment illustrated the rim 1 constituting the invention is made of metal in the usual cross sectional shape and split transversely as shown at 2, the ends 3 and 4 being connected by a metal strap 5 applied to the inner face of the rim and spanning the split portion 2 thereof. This strap 5 as shown has one end enlarged as shown at 6 and said end is secured to the rim end 4 by riveting.

The end 3 of the rim is provided near its terminal on its inner face with a boss 7 having a threaded socket to receive a bolt 8 which extends through an aperture in strap 5. A washer 9 is preferably arranged between the bolt head and the outer end of the boss. The aperture in the strap 5 is shaped to conform to the boss 7 as is shown clearly in Fig. 1, and fits down thereover.

This strap 5 is provided on its inner face or the face opposed to the rim with a series of teeth 10 and on its free end with a tooth 11 for a purpose presently to be described. The rim end 3 is equipped with laterally spaced transversely alined open bearings 12 and 13 which are designed to receive a shaft 14 of an operating tool hereinafter to be more fully described.

This tool of which the shaft 14 constitutes a part has mounted on said shaft near its outer end a cog gear 15 which is fixed to the shaft and designed to mesh with the teeth 11 and 10 of strap 5 for drawing together and releasing the ends 3 and 4 of the rim in a manner presently to be described. A connector 16 for securing the tool in operative position is constructed of a U-shaped metal strap the legs 17 and 18 of which are located adjacent opposite faces of the gear 15 and through which the shaft 14 extends, said legs being loosely mounted on the shaft. Each leg is provided with outwardly extending side flanges 19 designed to straddle and engage the edges of the bearings 12 and 13 for holding the tool in operative position with the gear thereof in engagement with tooth 11 of strap 5 as shown in Fig. 1 so that on the rotation of shaft 14 the gear 15 will lift strap 5 and the teeth of said gear meshing with the teeth 10 of the strap will force the strap away from rim 1 releasing it from the boss 7 and thus permit the split ends 3 and 4 of the rim to be forced apart and moved toward each other to permit a tire to be removed from or replaced on the rim.

A tooth 20 extends laterally inward from one of the flanges of leg 18 of the connector and is designed to engage with ratchet teeth 21 carried by a sleeve 22 slidably mounted on shaft 14 and which operates to lock the shaft against turning in one direction and permits it to turn in the other direction so that when the rim ends have been properly positioned the shaft will be held until the bolt 8 can be inserted for securing the rim ends together.

The sleeve 22 is longitudinally slotted as shown at 23 with a laterally extending recess 24 in one side wall of the slot to receive a stud 25 carried by shaft 14 and by means of which the sleeve may be locked in retracted inoperative position.

From the above description it will be obvious that a rim constructed as herein shown and described may be readily closed or opened for applying or removing a tire and after the tire has been secured by expanding the rim to its full extent with ends 3 and 4 abutting, said ends are secured in this position by fastening the strap 5 to end 3 by means of a bolt 8. The tool is then removed by sliding off the connector 16 from its engagement with the bearing lugs 12 and 13 and the tool may be stored in the tool-box ready for the next operation.

Various changes in the form, shape, proportion and other minor details of construction may be made without departing from the principle or sacrificing any of the advantages of the claimed invention.

I claim:—

1. The combination with a transversely split tire rim; of a longitudinally extending strap secured at one end to one end of said rim and overlapping the other end, said strap being provided with a rack and at its free end with a beveled tooth for engagement by a releasing element, to lift the rack to separate said rim ends.

2. A transversely split demountable rim having a metal strap secured to one rim end and spanning the split therein and adapted to be detachably connected with the other rim end, said strap having teeth on its face adjacent the rim and a tooth at its free end, bearing lugs carried by the rim end which is opposed to the end having a strap mounted thereon, said lugs being adapted to receive a pinion carrying shaft for the operation of the strap for drawing the rim ends together or for forcing them apart.

In testimony that I claim the foregoing as my own, I have hereto affixed my signature.

OLIVER P. MUNSON.